United States Patent
Miyake

(10) Patent No.: US 9,261,975 B2
(45) Date of Patent: Feb. 16, 2016

(54) APPARATUS AND METHOD FOR OPTICAL GESTURE RECOGNITION

(71) Applicant: MEGACHIPS CORPORATION, Osaka-shi, Osaka (JP)

(72) Inventor: Toshihide Miyake, Nara (JP)

(73) Assignee: MEGACHIPS CORPORATION, Osaka (JP)

( * ) Notice: Subject to any disclaimer, the term of this patent is extended or adjusted under 35 U.S.C. 154(b) by 55 days.

(21) Appl. No.: 14/349,123

(22) PCT Filed: Sep. 25, 2012

(86) PCT No.: PCT/JP2012/006067
§ 371 (c)(1),
(2) Date: Apr. 2, 2014

(87) PCT Pub. No.: WO2013/054478
PCT Pub. Date: Apr. 18, 2013

(65) Prior Publication Data
US 2014/0246588 A1    Sep. 4, 2014

(30) Foreign Application Priority Data

Oct. 13, 2011   (JP) .................................. 2011-225692

(51) Int. Cl.
| | |
|---|---|
| *G06M 7/00* | (2006.01) |
| *G06F 3/03* | (2006.01) |
| *G01B 11/00* | (2006.01) |
| *G01S 17/48* | (2006.01) |
| *G01S 7/491* | (2006.01) |
| *G06F 3/01* | (2006.01) |
| *G06F 3/042* | (2006.01) |

(52) U.S. Cl.
CPC ............ *G06F 3/0304* (2013.01); *G01B 11/002* (2013.01); *G01S 7/4913* (2013.01); *G01S 17/48* (2013.01); *G06F 3/017* (2013.01); *G06F 3/0421* (2013.01)

(58) Field of Classification Search
CPC ...................................................... G01B 11/002

USPC ........................................... 250/221; 345/175
See application file for complete search history.

(56) References Cited

U.S. PATENT DOCUMENTS

| | | | | |
|---|---|---|---|---|
| 5,943,233 | A * | 8/1999 | Ebina et al. ..................... | 700/85 |
| 2010/0150399 | A1 * | 6/2010 | Svajda et al. ................. | 382/103 |

FOREIGN PATENT DOCUMENTS

| | | |
|---|---|---|
| JP | 59-109805 | 6/1984 |
| JP | 4-307308 | 10/1992 |
| JP | 7-77424 | 3/1995 |
| JP | 7-83657 | 3/1995 |
| JP | 9-55051 | 2/1997 |
| JP | 10-177449 | 6/1998 |

OTHER PUBLICATIONS

International Search Report for PCT/JP2012/006067, mailed Dec. 4, 2012.

* cited by examiner

*Primary Examiner* — Thanh Luu
(74) *Attorney, Agent, or Firm* — Nixon & Vanderhye PC

(57) ABSTRACT

The optical position detection device includes a light irradiation unit that irradiates a target object with light, and a light receiving unit that receives reflected light from the target object. The light receiving unit includes a segmented photodiode in which a light receiving surface is two-dimensionally segmented into a plurality of light receiving regions, the segmented photodiode outputting a current corresponding to the intensity of light received by each of the light receiving regions; a light receiving lens that condenses the reflected light from the target object and forms an image of the target object on the light receiving surface of the segmented photodiode; and an arithmetic unit that detects a position of the target object in a two-dimensional direction orthogonal to the optical axis of the light receiving lens, based on the output currents corresponding to the respective light receiving regions of the segmented photodiode.

13 Claims, 8 Drawing Sheets

APPARATUS AND METHOD FOR OPTICAL GESTURE RECOGNITION

This application is the U.S. national phase of International Application No. PCT/JP2012/006067 filed 25 Sep. 2012 which designated the U.S. and claims priority to JP Patent Application No. 2011-225692 filed 13 Oct. 2011, the entire contents of each of which are hereby incorporated by reference.

TECHNICAL FIELD

The present invention relates to an optical position detection device which optically detects a position of an object.

BACKGROUND ART

In recent years, as a pointing input device of a computer, a gesture input system for inputting information corresponding to hand motions or the like has attracted attention. In order to realize the gesture input system, a technology of detecting a position of an object having a planner spread such as a hand, in a non-contact manner, is required.

An example of this type of technology is disclosed in Patent Document 1. The displacement measurement device disclosed in Patent Document 1 includes a light projecting unit which projects light having a larger spread than the surface dimension of a target object, a light receiving unit having a light receiving lens which condenses reflected light from the target object and a position detecting element located near the image formation position of the condensed reflected light; and an arithmetic processing means for calculating a displacement of the target object in a direction orthogonal to the projection axis of the light or a distance to the target object, based on an output from the light receiving unit.

Patent Document 1: JP 4-307308 A

SUMMARY

However, in the displacement measurement device disclosed in Patent Document 1, a position of a moving object which can be measured is limited to a particular one-dimensional direction of the directions orthogonal to the projection axis of light. As such, it is impossible to detect a two-dimensional position of a target object by one device.

An object of the present invention is to provide an optical position detection device capable of solving the above-described problem, that is, a problem that it is difficult to optically detect a two-dimensional position of a target object by one device.

An optical position detection device, according to an aspect of the present invention, includes a light irradiation unit that irradiates a target object with light, and a light receiving unit that receives reflected light from the target object.

The light receiving unit includes a segmented photodiode in which a light receiving surface is two-dimensionally segmented into a plurality of light receiving regions, the segmented photodiode outputting a current corresponding to the intensity of light received by each of the light receiving regions;

a light receiving lens that condenses the reflected light from the target object and forms an image of the target object on the light receiving surface of the segmented photodiode; and an arithmetic unit that detects a position of the target object in a two-dimensional direction orthogonal to the optical axis of the light receiving lens, based on the output currents corresponding to the respective light receiving regions of the segmented photodiode.

Further, an optical position detection method, according to another aspect of the present invention, includes irradiating a target object with light;

condensing reflected light from the target object by a light receiving lens, and forming an image of the target object on a light receiving surface of a segmented photodiode, the light receiving surface being two-dimensionally segmented into a plurality of light receiving regions;

taking out an output current corresponding to the intensity of light received by each of the light receiving regions, from the segmented photodiode; and detecting a position of the target object in a two-dimensional direction orthogonal to the optical axis of the light receiving lens, based on the respective output currents taken out.

As the present invention has the configuration described above, the present invention is able to optically detect the position of a target object in a two-dimensional direction orthogonal to the optical axis of the light receiving lens, by one device.

EXEMPLARY EMBODIMENTS

Next, exemplary embodiments of the present invention will be described in detail with reference to the drawings.

First Exemplary Embodiment

Figure 1:
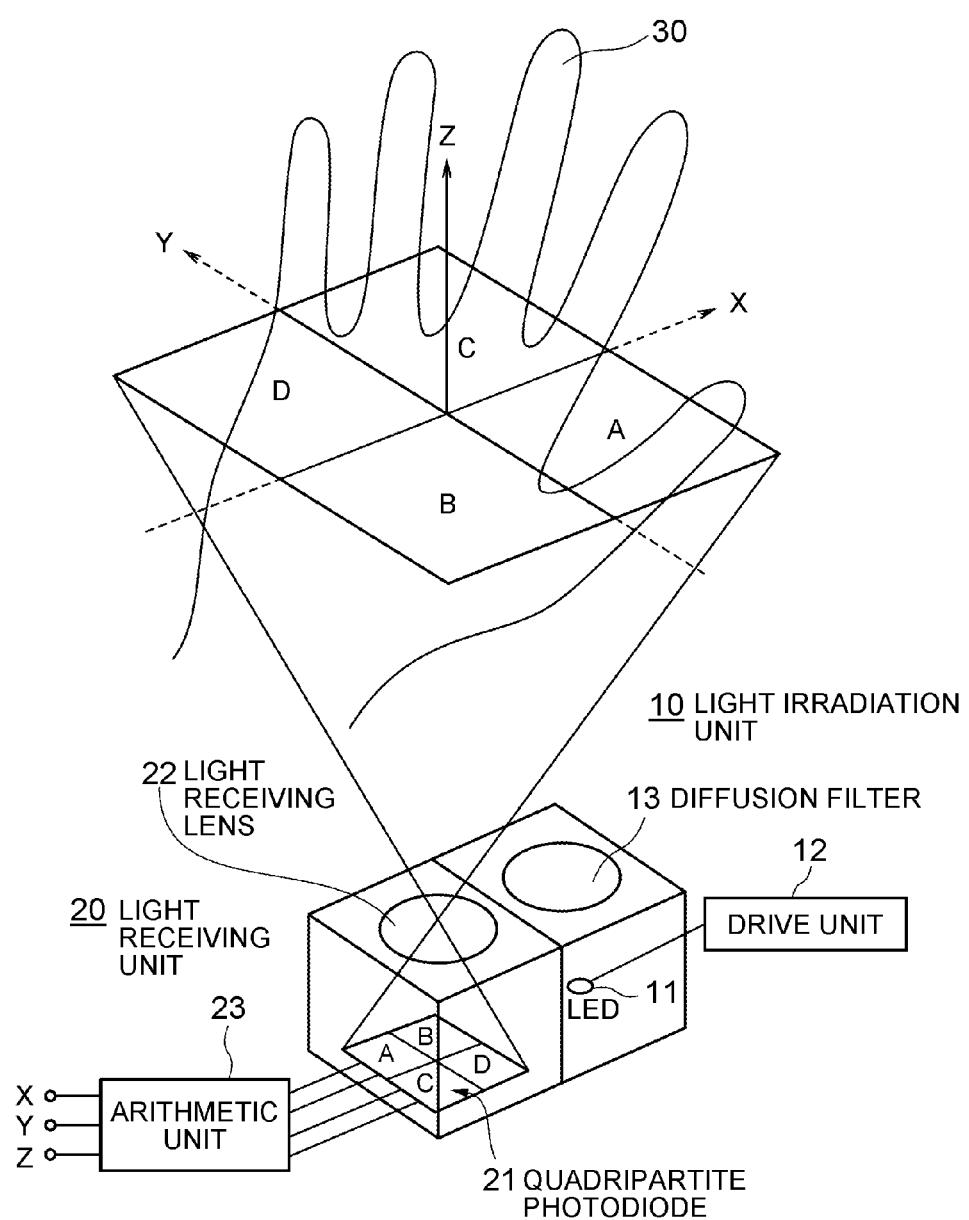
FIG. 1 is a block diagram showing a first exemplary embodiment of the present invention.

Referring to FIG. 1, an optical position detection device according to a first exemplary embodiment of the present invention includes a light irradiation unit 10 which irradiates a target object 30 with light, and a light receiving unit 20 which receives reflected light from the target object 30. The target object 30 is an object in which the position thereof is to be detected, and in the present embodiment, the target object is a human hand. However, the target object 30 is not limited to a human hand. Any other objects having a planar spread, including a human finger and a stick, may be acceptable.

The light irradiation unit 10 includes an infrared emitting diode 11; a drive unit 12 which intermittently drives the infrared emitting diode 11 so as to allow the infrared emitting diode 11 to emit infrared light in a pulse; and a diffusion filter 13 which converts the infrared light emitted from the infrared emitting diode 11 into diffused light spreading appropriately. Instead of the infrared emitting diode 11, another type of light emitting device such as a semiconductor laser device may be used. In an environment in which the light is distinguishable from outside light, it is possible to continuously drive the infrared emitting diode 11, rather than pulse-driving it.

The light receiving unit 20 includes a segmented photodiode 21 in which the light receiving surface is segmented two-dimensionally, a light receiving lens 22 which condenses reflected light from the target object 30 and forms an image of the target object 30 on the light receiving surface of the segmented photodiode 21, and an arithmetic unit 23. The segmented photodiode 21 is disposed such that the light receiving surface thereof is almost parallel to a plane orthogonal to the optical axis of the light receiving lens 22, at a location with a predetermined distance from the light receiving lens 22. Further, the segmented photodiode 21 is disposed such that the center thereof crosses the optical axis of the light receiving lens 22.

As the segmented photodiode 21A, a quadripartite photodiode is used in the present embodiment. In the quadripartite photodiode 21, the light receiving surface is segmented into two rows and two columns by an approximately cross-shaped parting line, in which an output signal current of the photodiode corresponding to each of the first row and first column, the first row and second column, the second row and first column, and the second row and second column of the segmented light receiving surface, can be taken out independently. Hereinafter, output signal currents of the photodiode corresponding to the first row and first column, the first row and second column, the second row and first column, and the second row and second column of the segmented light receiving surface are described as A, B, C, and D, respectively. The areas of the respective light receiving regions formed by segmenting the light receiving surface are almost the same.

The arithmetic unit 23 has a function of accepting the output signal currents A to D of the segmented photodiode 21 and performs arithmetic operation thereon to thereby detect the position of the target object 30 in a two-dimensional direction orthogonal to the optical axis of the light receiving lens 22, and a distance to the target object 30. The present embodiment uses a three-dimensional coordinate system in which the optical axis of the light receiving lens 22 is a Z axis, a point on the Z axis with a predetermined distance L0 from the center of the light receiving surface of the quadripartite photodiode 21 is the origin O of the coordinate, a line which is parallel to the parting line segmenting the light receiving surface of the quadripartite photodiode into the first row and the second row and is orthogonal to the Z axis passing through the origin O is an X axis, and a line which is parallel to the parting line segmenting the light receiving surface of the quadripartite photodiode into the first column and the second column and is orthogonal to the Z axis passing through the origin O is a Y axis.

The position of the target object 30 in a two-dimensional direction orthogonal to the optical axis of the light receiving lens 2, that is, an X coordinate value and a Y coordinate value, can be obtained by calculating the ratio given by the following expressions based on the output signal currents A to D of the segmented photodiode 21.

$$X \text{ coordinate value} = (A+C)/(A+B+C+D) - 0.5 \quad (1)$$

$$Y \text{ coordinate value} = (C+D)/(A+B+C+D) - 0.5 \quad (2)$$

It should be noted that the X coordinate value and the Y coordinate value show the relative position, rather than the absolute position, of the target object 30.

If the centroid of the target object 30 is at the origin O, as the respective values of A+B, C+D, A+C, and B+D are the same, the X coordinate value=0 and the Y coordinate value=0. If the centroid of the target object 30 moves in a positive direction on the X axis, A+C becomes larger than B+D, whereby the X coordinate value approaches ½. On the contrary, if the centroid of the target object 30 moves in a negative direction on the X axis, A+C becomes smaller than B+D, whereby the X coordinate value approaches −½. Meanwhile, if the centroid of the target object 30 moves in a positive direction on the Y axis, C+D becomes larger than A+B, whereby the Y coordinate value approaches ½. On the contrary, if the centroid of the target object 30 moves in a negative direction of the Y axis, C+D becomes smaller than A+B, whereby the Y coordinate value approaches −½.

The distance to the target object 30, namely the Z coordinate value, can be obtained by calculating the ratio given by the following expression based on the output signal currents A to D of the segmented photodiode 21.

$$Z \text{ coordinate value} = TH/(A+B+C+D+TH) - 0.5 \quad (3)$$

Here, TH is a value equal to the sum of the output signal currents A to D of the segmented photodiode 21 when the centroid of the target object 30 is at the point of origin O. The Z coordinate value shows the relative position, rather than the absolute position, of the target object 30.

If the centroid of the target object 30 is at the origin O, as the value of A+B+C+D equals to the value of TH, the Z coordinate value=0. If the centroid of the target object 30 moves in a positive direction on the Z axis, which means if the target objects moves away, the value of A+B+C+D becomes smaller than the value of TH, whereby the Z coordinate value approaches ½. On the contrary, if the centroid of the target object 30 moves in a negative direction on the Z axis, which means if the target object moves closer, the value of A+B+C+D becomes larger than the value of TH, whereby the Z coordinate value approaches −½.

While a constant term −0.5 is added in the above-described Expressions (1) to (3), it is possible to use the following Expressions (4) to (6) in each of which the value of a constant term is α, β, and γ (predetermined constant including 0).

$$X \text{ coordinate value} = (A+C)/(A+B+C+D) + \alpha \quad (4)$$

$$Y \text{ coordinate value} = (C+D)/(A+B+C+D) + \beta \quad (5)$$

$$Z \text{ coordinate value} = TH/(A+B+C+D) + \gamma \quad (6)$$

In this case, the coordinate system becomes one in which the above-described coordinate system is shifted by a position corresponding to α, β, and γ.

Next, the details of the respective units will be described.

Figure 2:
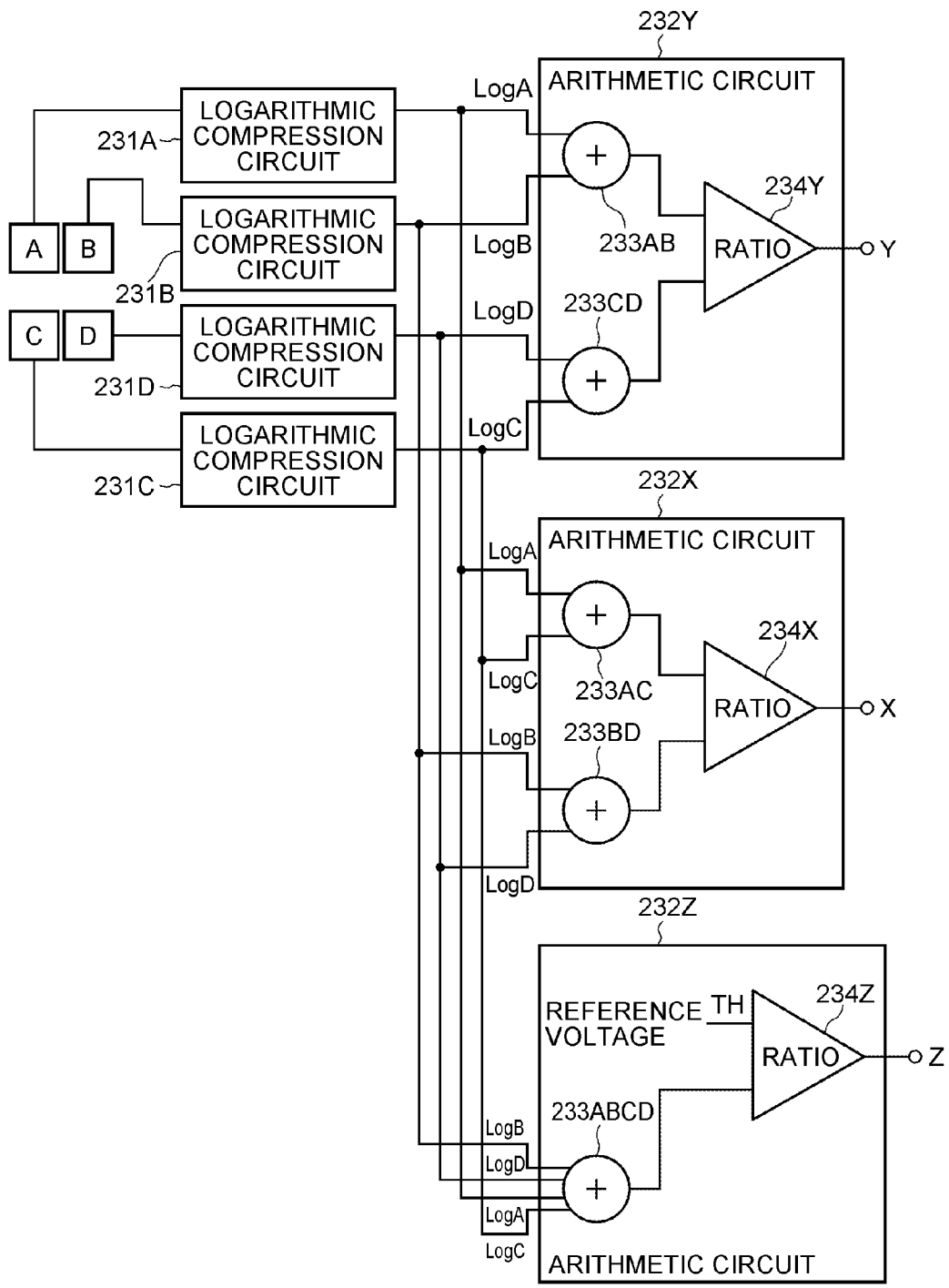
FIG. 2 is a block diagram showing an arithmetic unit according to the first exemplary embodiment of the present invention.

FIG. 2 is a block diagram of the arithmetic unit 23. The arithmetic unit 23 of this example includes logarithmic compression circuits 231A to 231D which, after amplifying the output signal currents A to D of the segmented photodiode 21, performs logarithmic compression thereon and outputs them as voltage signals Log A to Log D, an arithmetic circuit 232X which accepts the voltage signals Log A to Log D and outputs a value of (A+C)/(A+B+C+D) represented by Expression (4)

as an X coordinate value, an arithmetic circuit 232Y which accepts the voltage signals Log A to Log D and outputs a value of (C+D)/(A+B+C+D) represented by Expression (5) as a Y coordinate value, and an arithmetic circuit 232Z which accepts the voltage signals Log A to Log D and a threshold TH and outputs a value of TH/(A+B+C+D+TH) represented by Expression (6) as a Z coordinate value. In this description, Log represents a natural logarithm.

The arithmetic circuit 232X includes an adder 233AC which accepts the voltage signal Log A and the voltage signal Log C and outputs a voltage signal Log(A+C), an adder 233BD which accepts the voltage Log B and the voltage signal Log D and outputs a voltage signal Log(B+D), and a ratio computing unit 234X which accepts the voltage signal Log(A+C) and the voltage signal Log(B+D) and outputs a ratio (A+C)/(A+B+C+D).

The arithmetic circuit 232Y includes an adder 233AB which accepts the voltage signal Log A and the voltage signal Log B and outputs a voltage signal Log(A+B), an adder 233CD which accepts the voltage signal Log C and the voltage signal Log D and outputs a voltage signal Log(C+D), and a ratio computing unit 234Y which accepts the voltage signal Log(A+B) and the voltage signal Log(C+D) and outputs a ratio (C+D)/(A+B+C+D).

The arithmetic circuit 232Z includes an adder 233ABCD which accepts the voltage signals Log A to Log D and outputs a voltage signal Log(A+B+C+D), and a ratio computing unit 234Z which accepts the voltage signal Log(A+B+C+D) and the reference voltage TH and outputs a ratio TH/(A+B+C+D+TH).

Figure 3:
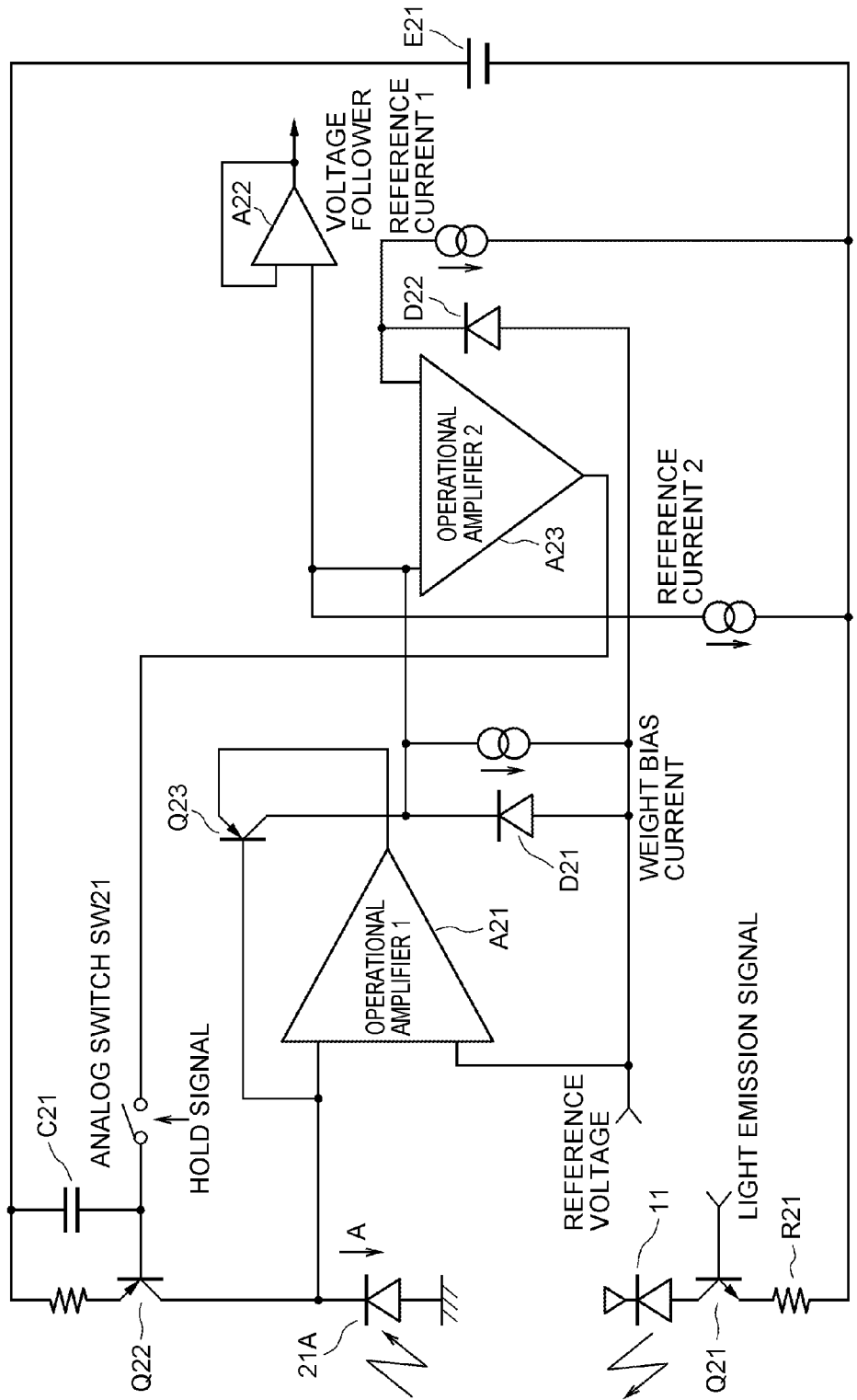
FIG. 3 is a circuit diagram showing an exemplary configuration of a logarithmic compression circuit and an exemplary configuration of a drive unit of an infrared emitting diode in the arithmetic unit, according to the first exemplary embodiment of the present invention.

FIG. 3 is a circuit diagram showing an exemplary configuration of the logarithmic compression circuit 231 and an exemplary configuration of the drive unit 12 of the infrared emitting diode 11 in the arithmetic unit 23.

First, a circuit of the drive unit 12 will be described. The drive unit 12 is configured of a transistor Q21 and a resistor R21 connected to the infrared emitting diode 11. When a light-emitting signal added to the base of the transistor Q21 is at an H (High) level for a period of a pulse width T, the transistor Q21 is turned on for a period T, and the current from a source E21 flows into the infrared emitting diode 11 through the resistor R21 and the transistor Q21 to cause a pulse of infrared light to be emitted.

Next, the logarithmic compression circuit 231 will be described. FIG. 3 only shows the logarithmic compression circuit 231A among the four logarithmic compression circuit 231A to 231D shown in FIG. 2. The other logarithmic compression circuits 231B to 231D have the same configuration as that of the logarithmic compression circuit 231A.

Infrared light emitted from the infrared emitting diode 11 and reflected by the target object 30 and stationary light are received by the segmented photodiode 21. A photodiode 21A in FIG. 3 represents a photodiode which takes out the output signal current A, among the photodiodes corresponding to the respective regions of the segmented light receiving surface of the segmented photodiode 21. A stationary light current of the output signal current A of the photodiode 21A is supplied from a transistor Q22, and only a signal light current is guided to an operational amplifier A21. The signal light current is amplified by the operational amplifier A21, and is logarithmically compressed by a diode D21 for logarithmic compression through a transistor Q23 connected to the output side thereof. The signal having been logarithmically compressed by the diode 21 for logarithmic compression is output to an arithmetic circuit 232 as an output voltage of the logarithmic compression circuit 231A through a voltage follower A22.

The grounds that only the stationary light of the output signal current A is extracted by the transistor Q22 are as follows. First, before allowing the infrared emitting diode 11 to emit light, an analog switch SW21 is turned on by a hold signal. In this state, stationary light such as sunlight and fluorescent light is detected by the photodiode 21A. The output signal current A caused by this detection is amplified by the operational amplifier A21, and the voltage logarithmically compressed by the diode D21 is guided to the operational amplifier A23 and converted into a deviation signal with the reference voltage of the diode D22, and is guided to the base of the transistor Q22 through the analog switch SW21. The output voltage of the operational amplifier A23 is set to have a value such that the stationary light current and the collector current of the transistor Q22 are balanced by the negative feedback, and the value is held by a hold capacitor C21. Then, when the analog switch SW21 is turned off and the infrared emitting diode 11 is allowed to emit light, only stationary light current of the output current of the photodiode 21A is still supplied from the transistor Q22.

Figure 4:
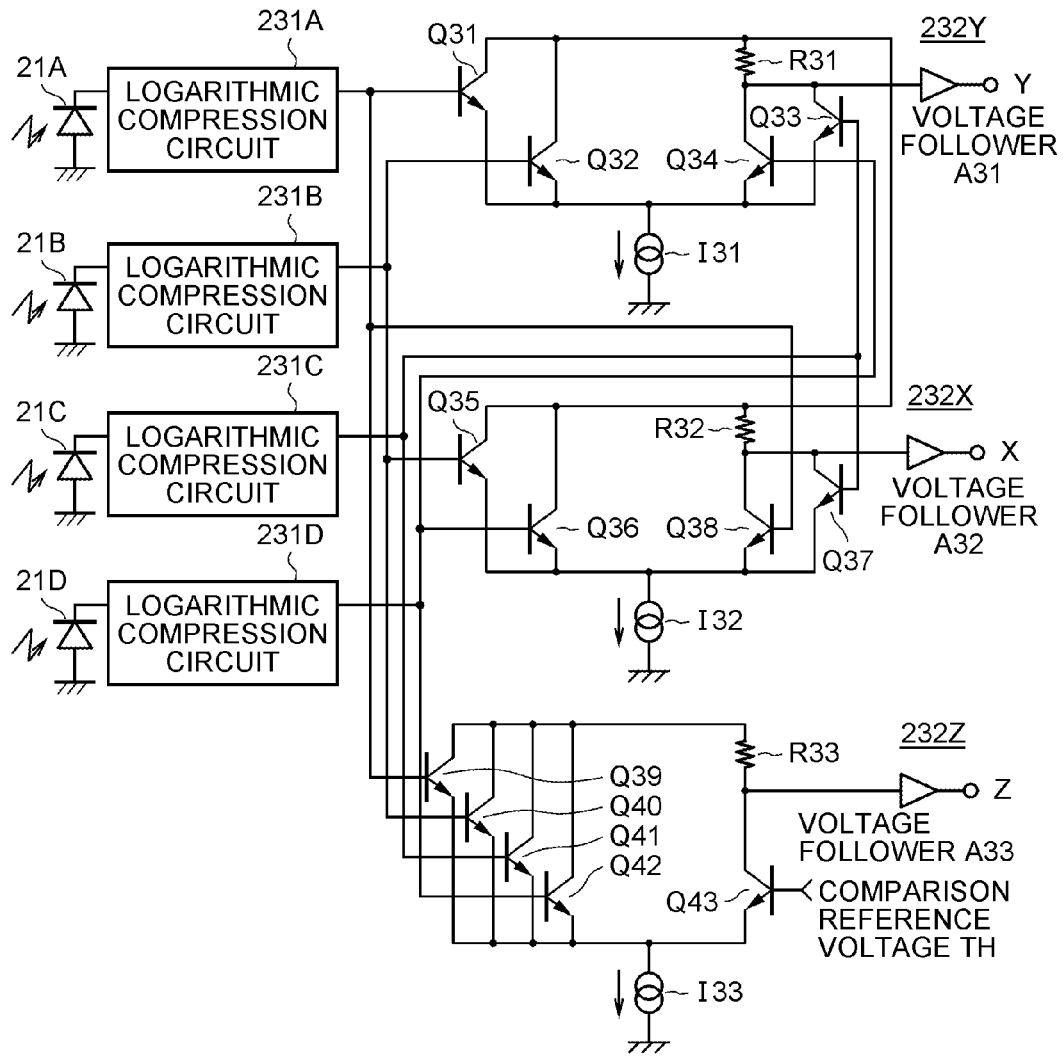
FIG. 4 is a circuit diagram showing an exemplary arithmetic circuit in the arithmetic unit according to the first exemplary embodiment of the present invention.

FIG. 4 is a circuit diagram of the arithmetic circuit 232 of the arithmetic unit 23. The photodiodes 21A to 21D in FIG. 4 show the photodiodes taking out the output signal currents A to D respectively, corresponding to the respective regions of the segmented light receiving surface of the segmented photodiode 21. After being amplified by the logarithmic compression circuits 231A to 231D, the output signal currents A to D are logarithmically compressed, and are output to the arithmetic circuits 232X, 232Y, and 232Z as the voltage signals Log A to Log D.

The arithmetic circuit 232Y is configured of two transistors Q31 and Q32 in which both emitters are connected with each other and both collectors are connected with each other and the voltage signals Log A and Log B are input to the bases; two transistors Q33 and Q34 in which both emitters are connected with each other and both collectors are connected with each other and the voltage signals Log C and Log D are input to the bases; a constant current source I31 connected between the emitters of the transistors Q31 to Q34 and the ground; a resistor R31 connected between the collectors of the transistors Q31 and Q32 and the collectors of the transistors Q33 and Q34; and a voltage follower A31 which takes out an output relating to the Y coordinate value from the connection point between the collectors of the transistors Q33 and 34 and the resistor R31. In this example, the transistors Q31 to Q34 constitute a differential amplifier.

The arithmetic circuit 232X has the same circuit configuration as that of the arithmetic circuit 232Y. Specifically, the arithmetic circuit 232X is configured of two transistors Q35 and Q36 in which both emitters are connected with each other and both collectors are connected with each other and the voltage signals Log B and Log D are input to the bases; two transistors Q37 and Q38 in which both emitters are connected with each other and both collectors are connected with each other and the voltage signals Log A and Log C are input to the bases; a constant current source I32 connected between the emitters of the transistors Q35 to Q38 and the ground; a resistor R32 connected between the collectors of the transistors Q37 and Q38 and the collectors of the transistors Q35 and Q36; and a voltage follower A32 which takes out an output relating to the X coordinate value from the connection point between the collectors of the transistors Q37 and 38 and the resistor R32. In this example, the transistors Q35 to Q38 constitute a differential amplifier.

Further, the collectors of the transistors Q31 and Q32 of the arithmetic circuit 232Y and the collectors of the transistors Q35 and Q36 of the arithmetic circuit 232X are connected with each other.

The arithmetic circuit 232Z is configured of four transistors Q39 to Q42 in which the emitters are connected with one another and the collectors are connected with one another and the voltage signals Log A to Log D are input to the bases; a constant current source I33 connected between the emitters of the transistors Q39 to Q42 and the ground; a transistor Q43 in which the emitter it grounded via the constant current source I33, the collector is connected to the collectors of the transistors Q39 to Q42 via the resistor R33, and the reference voltage TH is input to the base; and a voltage follower A33 which takes out an output relating to the Z coordinate value from the connection point between the collector of the transistor Q43 and the resistor R33.

The grounds that (C+D)/(A+B+C+D) is generated as an output Y from the four input voltage signals Log A to Log D in the arithmetic circuit 232Y will be described with reference to FIGS. 7 and 8.

Figure 7:
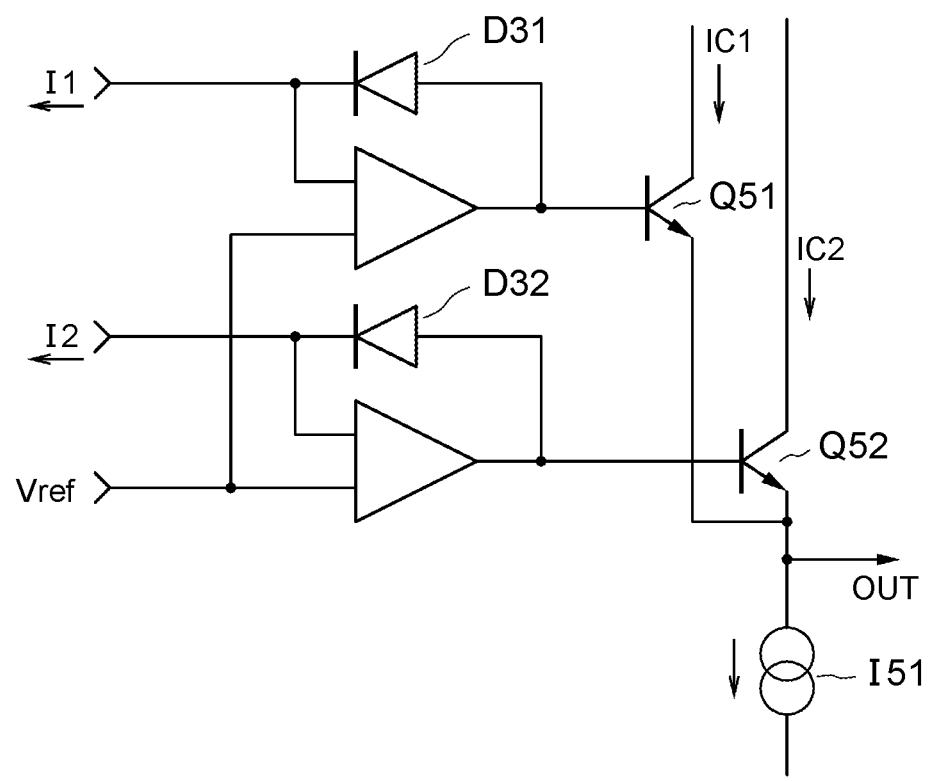
FIG. 7 is a circuit diagram for explaining an action of an arithmetic circuit in the arithmetic unit according to the first exemplary embodiment of the present invention.

In the circuit shown in FIG. 7, when a current I1 flows into the diode D31, the anode voltage of the diode D31 is represented as VT·Log(I1/Io) (VT=K·T/q, where K represents a Boltzmann constant, T represents an absolute temperature, q represents an electron charge, and Io represents a reverse saturation current) with respect to the cathode potential (=Vref). As the anode of the diode D31 is connected to the base of the transistor Q51, the base voltage of the transistor Q51 also becomes Vref+VT·Log(I1/Io). Similarly, the base voltage of the transistor Q52 becomes Vref+VT·Log(I2/Io).

The difference between the base potentials of the transistors Q51 and Q52, when calculated from the difference between the anode voltages of the diodes D31 and D32, is given by the following Expression (7).

$$V(Q51) - V(Q52) = (Vref + VT \cdot \text{Log}(I1/Io)) - \\ (Vref + VT \cdot \text{Log}(I2/Io)) \\ = VT \cdot \text{Log}(I1/I2)$$ (7)

On the other hand, assuming that the collector current of the transistor Q51 is IC1, the base-emitter voltage of the transistor Q51 is VT·Log(IC1/Io). Similarly, assuming that the collector current of the transistor Q52 is IC2, the base-emitter voltage of the transistor Q51 is VT·Log(IC2/Io). As such, the difference between the base voltages of the transistors Q51 and Q52, calculated from the difference between the base-emitter voltages of the transistors Q51 and Q52, is given by the following Expression (8).

$$V(Q51) - V(Q52) = VT \cdot (\text{Log}(IC1/Io) - \text{Log}(IC2/Io)) \\ = VT \cdot \text{Log}(IC1/IC2)$$ (8)

From Expression (7) and Expression (8), it is understood that the relation of I1:I2=IC1:IC2 is established. This means that the collector current IC1 of the transistor Q51 equals to the bias current I51·(I1/(I1+I2)).

Further, at this moment, the OUT voltage in FIG. 7 is given by the following Expression (9).

$$\text{OUT voltage} = (Vref + VT \cdot \text{Log}(I1/Io)) - VT \cdot \text{Log}(IC1/Io) \\ = (Vref + VT \cdot \text{Log}(I1/Io)) - \\ VT \cdot \text{Log}(I51 \cdot (I1/(I1+I2))/Io) \\ = Vref + VT \cdot \text{Log}((I1+I2)/I51)$$ (9)

Figure 8:
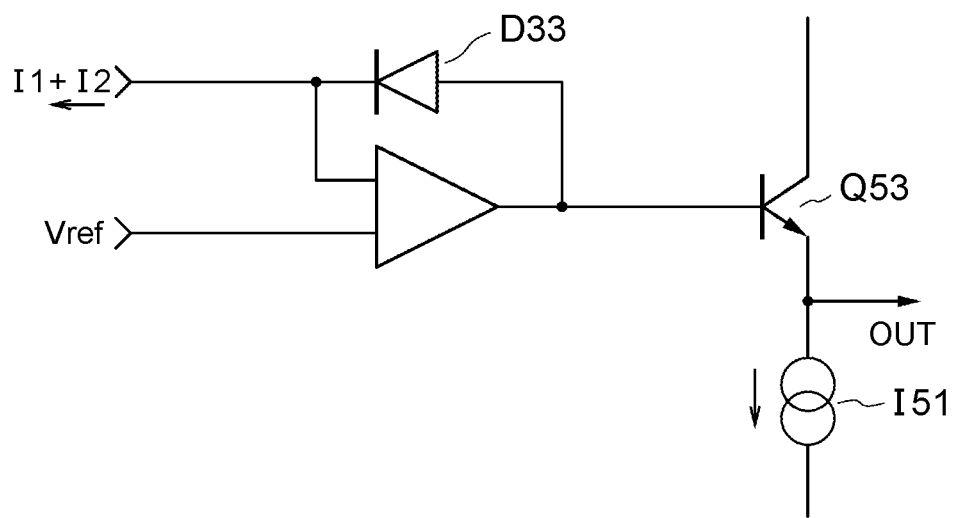
FIG. 8 is a circuit diagram for explaining an action of an arithmetic circuit in the arithmetic unit according to the first exemplary embodiment of the present invention.

On the other hand, FIG. 8 shows a circuit in which after the currents I1 and I2 are added, the current is logarithmically compressed and the signal is converted into a voltage and is output via a voltage follower. It is clearly understood that the OUT voltage in the circuit shown in FIG. 8 is given by the above-described Expression (9). As such, it is understood that the circuit shown in FIG. 7 equivalently generates the value, obtained by adding a signal and performing logarithmic compression, by arithmetic operation from each of the logarithmically compressed values.

Meanwhile, in the arithmetic circuit 232Y shown in FIG. 4, if the currents flowing in the transistors Q31, Q32, Q33, and Q34 are represented as IC(Q31), IC(Q32), IC(Q33), and IC(Q34), and the signal currents of the photodiodes 21A, 21B, 21C, and 21D are represented as I(21A), I(21B), I(21C), and I(21D), the following relationship is established, as clearly understood from the description of FIG. 7 and FIG. 8.

$$IC(Q31):IC(Q32):IC(Q33):IC(Q34)=I(21A):I(21B):I(21C):I(21D)$$ (10)

Accordingly, the voltage at both ends of the resistor R31 in the arithmetic circuit 232Y (that is, an output Y of the voltage follower A31) is given by the following expression.

$$\text{Voltage at both ends of the resistor } R31 = R31 \cdot I31(I(21C)+I(21D))/(I(21A)+I(21B)+I(21C)+I(21D))$$ (11)

These are the grounds that (C+D)/(A+B+C+D) is generated, as an output Y, from the four input voltage signals Log A to Log D in the arithmetic circuit 232Y.

The grounds that a ratio (A+C)/(A+B+C+D) is generated as an output X from the four input voltage signals Log A to Log D and the grounds that TH/(A+B+C+D+TH) is generated as an output Z from the four input voltage signals Log A to Log D and a comparison reference voltage TH in the arithmetic circuit 232Z are the same as those of the arithmetic circuit 232Y.

Figure 5:
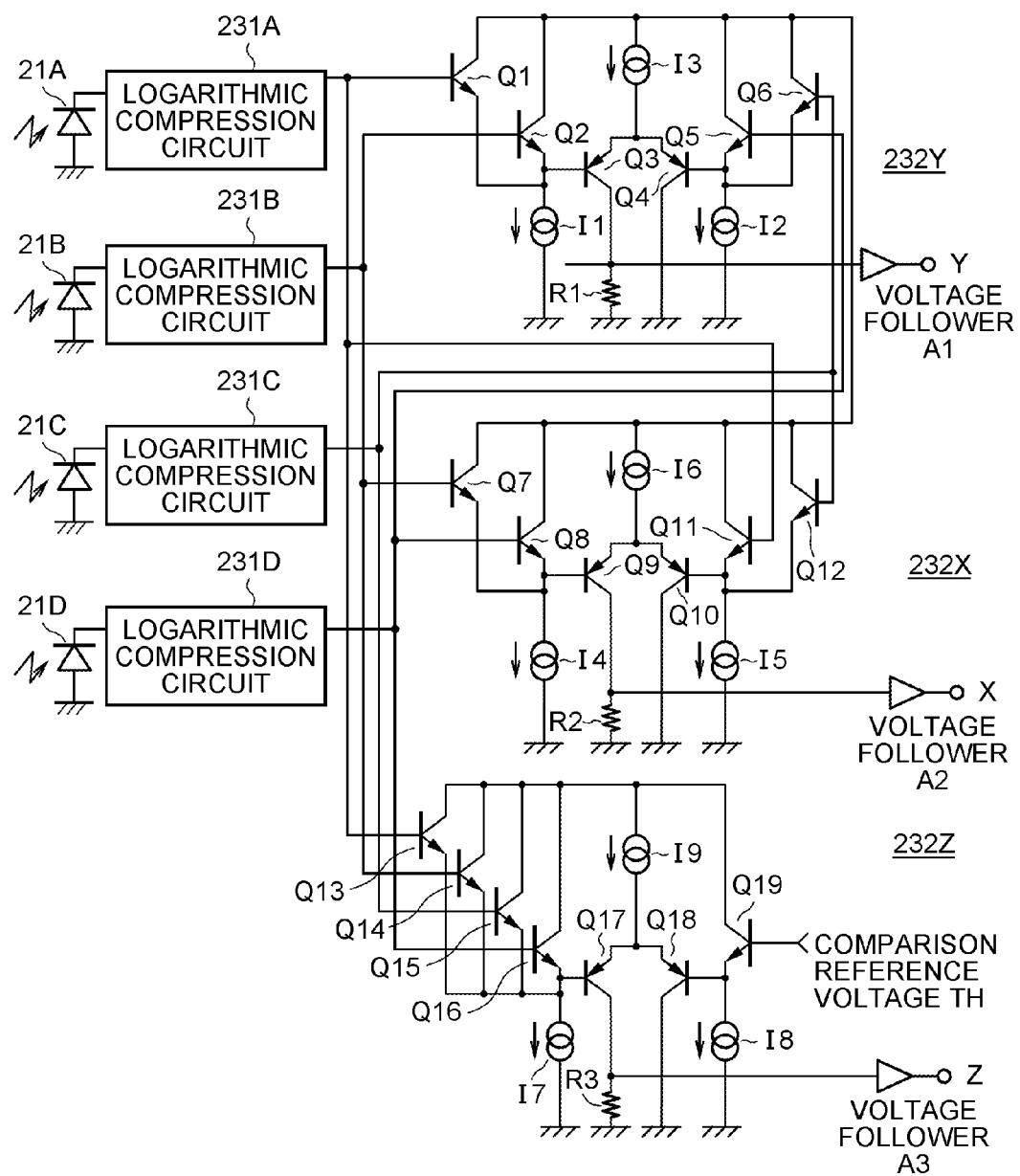
FIG. 5 is a circuit diagram showing another exemplary arithmetic circuit in the arithmetic unit according to the first exemplary embodiment of the present invention.

In the circuit shown in FIG. 4, although the transistors in which the collectors and the emitters are connected respectively and different voltages are applied to the bases are used for a direct differential, a differential amplifier may be used additionally. FIG. 5 is a circuit diagram of the arithmetic circuit 232 of the arithmetic unit 23 using such a scheme. The photodiodes 21A to 21D in FIG. 5 represent photodiodes which take out output signal currents A to D, corresponding to the respective regions of the segmented light receiving surface of the segmented photodiode 21. After being amplified by the logarithmic compression circuits 231A to 231D, the output signal currents A to D are logarithmically compressed, and are output to the arithmetic circuits 232X, 232Y, and 232Z as the voltage signals Log A to Log D.

The arithmetic circuit 232Y is configured of two transistors Q1 and Q2 in which both emitters are connected with each other and both collectors are connected with each other and the voltage signals Log A and Log B are input to the bases; a constant current source I1 connected between the emitters of the transistors Q1 and Q2 and the ground; two transistors Q6 and Q5 in which both emitters are connected with each other and both collectors are connected with each other and the voltage signals Log C and Log D are input to the bases; a constant current source I2 connected between the emitters of the transistors Q5 and Q6 and the ground; a transistor Q3 in which the base is connected to the emitters of the transistors Q1 and Q2, the collector is grounded via a resistor R1, and the emitter is connected to a constant current source I3; a transistor Q4 in which the base is connected to the emitters of the transistors Q5 and Q6, the collector is grounded, and the emitter is connected to the constant current source I3; and a voltage follower A1 which takes out an output relating to the Y coordinate value from the connection point between the collector of the transistor Q3 and the resistor R31. In this example, the transistors Q3 and Q4, the constant current source I3, and the resistor R1 constitute a differential amplifier.

The arithmetic circuit 232X has the same circuit configuration as that of the arithmetic circuit 232Y. Specifically, the arithmetic circuit 232X is configured of two transistors Q7 and Q8 in which both emitters are connected with each other and both collectors are connected with each other and the voltage signals Log B and Log D are input to the bases; a constant current source I4 connected between the emitters of the transistors Q7 and Q8 and the ground; two transistors Q11 and Q12 in which both emitters are connected with each other and both collectors are connected with each other and the voltage signals Log A and Log C are input to the bases; a constant current source I5 connected between the emitters of the transistors Q11 and Q12 and the ground; a transistor Q9 in which the base is connected to the emitters of the transistors Q7 and Q8, the collector is grounded via a resistor R2, and the emitter is connected to a constant current source I6; a transistor Q10 in which the base is connected to the emitters of the transistors Q11 and Q12, the collector is grounded, and the emitter is connected to the constant current source I6; and a voltage follower A2 which takes out an output relating to the X coordinate value from the connection point between the collector of the transistor Q9 and the resistor R2.

Further, the collectors of the transistors Q1, Q2, Q5, and Q6 of the arithmetic circuit 232Y and the collectors of the transistors Q7, Q8, Q11, and Q12 of the arithmetic circuit 232X are connected with each other.

The arithmetic circuit 232Z is configured of four transistors Q13 to Q16 in which the emitters are connected with each other and the collectors are connected with each other and the voltage signals Log A to Log D are input to the bases; a constant current source I7 connected between the emitters of the transistors Q13 to Q16 and the ground; a transistor Q19 in which the emitter is grounded via a constant current source I8, the collector is connected to the collectors of the transistors Q13 to Q16, and a reference voltage TH is input to the base; a transistor Q17 in which the base is connected to the emitters of the transistors Q13 to Q16, the collector is grounded via a resistor R3, and the emitter is connected to a constant current source I9; a transistor Q18 in which the base is connected to the emitter of the transistor Q19, the collector is grounded, and the emitter is connected to the constant current source I9; and a voltage follower A3 which takes out an output relating to the Z coordinate value from the connection point between the collector of the transistor Q17 and the resistor R3. In this example, the transistors Q17 and Q18, the constant current source I9, an the resistor R3 constitute a differential amplifier.

The grounds that (A+C)/(A+B+C+D) is generated as an output X from the four input voltage signals Log A to Log D in the arithmetic circuit 232X, the grounds that a ratio (C+D)/(A+B+C+D) is generated as an output Y from the four input voltage signals Log A to Log D in the arithmetic circuit 232Y, and the grounds that TH/(A+B+C+D+TH) is generated as an output Z from the four input voltage signals Log A to Log D and a comparison reference voltage TH in the arithmetic circuit 232Z, are the same as those of the arithmetic circuit 232Y shown in FIG. 4.

Figure 6:
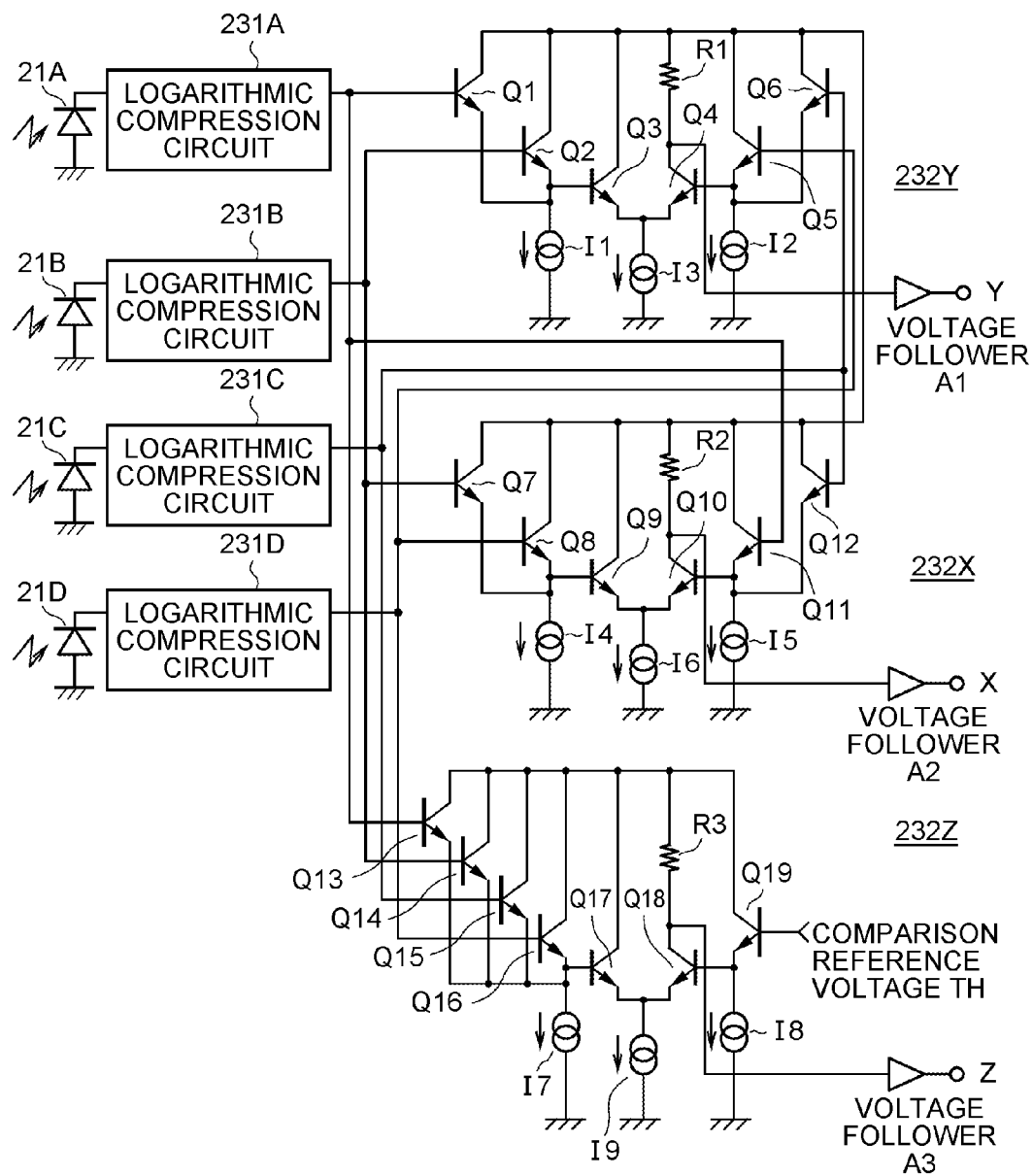
FIG. 6 is a circuit diagram showing yet another exemplary arithmetic circuit in the arithmetic unit according to the first exemplary embodiment of the present invention.

While the transistors Q3, Q4, Q9, Q10, Q17, and Q18 constituting the differential amplifiers in FIG. 5 are PNP transistors, it is possible to use NPN transistors. In that case, the circuit configuration thereof is one as shown in FIG. 6.

As described above, according to the present embodiment, it is possible to optically detect the position of the target object 30 in a two-dimensional direction (XY direction) orthogonal to the optical axis of the light receiving lens 22 and a distance (Z direction) to the target object 30, by one device.

Further, in the displacement measurement device disclosed in Patent Document 1, as it is necessary to arrange two sets of light receiving units, namely a set of a first light receiving lens and a position detector and another set of a second light receiving lens and a position detector, with a distance between them, the device is increased in size. However, according to the present embodiment, as it is only necessary to use a single set of the light receiving lens 2 and the segmented photodiode, the device can be reduced in size.

Other Exemplary Embodiments

While the present invention has been described with reference to the exemplary embodiments described above, the present invention is not limited to the above-described embodiments. Additions and changes can be made therein in various manners. For example, while a quadripartite photodiode is used in the above-described embodiment, the number of segments may be set arbitrary if two sets of photodiodes, orthogonal to each other, can be made.

For example, it is possible to use a tripartite photodiode by sharing a photodiode of the two sets of photodiode, orthogonal to each other, as one of the combinations of the X axis and the Y axis. Further, the shape of the segmented photodiode is not limited to rectangle. A shape other than rectangle is acceptable if respective regions of the light receiving surface are in the same shape. For example, the light receiving surface may be segmented into 2n pieces of light receiving regions which are approximately point symmetric with respect to the center point of the light receiving surface, where n is a positive integer not smaller than 2.

The present invention is based upon and claims the benefit of priority from Japanese patent application No. 2011-225692, filed on Oct. 13, 2011, the disclosure of which is incorporated herein in its entirety by reference.

DESCRIPTION OF REFERENCE NUMERALS 10 light irradiation unit
11 infrared emitting diode
12 drive unit
13 diffusion filter
20 light receiving unit
21 segmented photodiode
22 light receiving lens
23 arithmetic unit
30 target object

The invention claimed is:
1. An optical position detection device comprising:
a light irradiation unit that irradiates a target object with light; and
a light receiving unit that receives reflected light from the target object, wherein the light receiving unit includes:
a segmented photodiode in which a light receiving surface is two-dimensionally segmented into a plurality of light receiving regions, the segmented photodiode outputting a current corresponding to intensity of light received by each of the light receiving regions;

a light receiving lens that condenses the reflected light from the target object and forms an image of the target object on the light receiving surface of the segmented photodiode; and an arithmetic unit that detects a position of the target object in a two-dimensional direction orthogonal to an optical axis of the light receiving lens, based on output currents corresponding to the respective light receiving regions of the segmented photodiode, and detects a position of the target object in a direction orthogonal to the two-dimensional direction, based on a ratio of a predetermined reference value, to a sum of a total sum of the output currents corresponding to the respective light receiving regions of the segmented photodiode and the reference value.

2. The optical position detection device according to claim 1, wherein the segmented photodiode is configured such that the light receiving surface is segmented into 2n pieces of light receiving regions which are approximately point symmetric with respect to a center point of the light receiving surface, the arithmetic unit detects a position of the target object in one direction of the two-dimensional direction, based on a ratio of a sum of the output currents corresponding to n pieces of adjacent light receiving regions among the 2n pieces of the light receiving regions, to a total sum of the output currents corresponding to the respective light receiving regions of the segmented photodiode, and the arithmetic unit detects a position of the target object in another direction of the two-dimensional direction, based on a ratio of a sum of the output currents corresponding to n pieces of the light receiving regions which are adjacent in a direction orthogonal to an alignment direction of the n pieces of the light receiving regions used for detection of the position of the target object in the one direction among the 2n pieces of the light receiving regions, to a total sum of the output currents corresponding to the respective light receiving regions of the segmented photodiode.

3. The optical position detection device according to claim 1, wherein the segmented photodiode is configured such that the light receiving surface is segmented into four light receiving regions by an approximately cross-shaped parting line, the arithmetic unit detects a position of the target object in one direction of the two-dimensional direction, based on a ratio of a sum of the output currents corresponding to two adjacent light receiving regions among the four light receiving regions, to a total sum of the output currents corresponding to the respective light receiving regions of the segmented photodiode, and the arithmetic unit detects a position of the target object in another direction of the two-dimensional direction, based on a ratio of a sum of the output currents corresponding to two light receiving regions which are adjacent in a direction orthogonal to an alignment direction of the two light receiving regions used for detection of the position of the target object in the one direction among the four light receiving regions, to a total sum of the output currents corresponding to the respective light receiving regions of the segmented photodiode.

4. The optical position detection device according to claim 1, wherein the arithmetic unit includes:

a logarithmic compression circuit that logarithmically compresses the output current corresponding to each of the light receiving regions of the segmented photodiode, converts into a voltage, and outputs the voltage;

a first arithmetic circuit that accepts the voltage output from the logarithmic compression circuit, and outputs a voltage corresponding to a position of the target object in one direction of the two-dimensional direction; and a second arithmetic circuit that accepts the voltage output from the logarithmic compression circuit, and outputs a voltage corresponding to a position of the target object in another direction of the two-dimensional direction.

5. An optical position detection device comprising:

a light irradiation unit that irradiates a target object with light; and a light receiving unit that receives reflected light from the target object, wherein the light receiving unit includes:

a segmented photodiode in which a light receiving surface is two-dimensionally segmented into a plurality of light receiving regions, the segmented photodiode outputting a current corresponding to intensity of light received by each of the light receiving regions;

a light receiving lens that condenses the reflected light from the target object and forms an image of the target object on the light receiving surface of the segmented photodiode; and an arithmetic unit that detects a position of the target object in a two-dimensional direction orthogonal to an optical axis of the light receiving lens, based on output currents corresponding to the respective light receiving regions of the segmented photodiode, the arithmetic unit includes;

a logarithmic compression circuit that logarithmically compresses the output current corresponding to each of the light receiving regions of the segmented photodiode, converts into a voltage, and outputs the voltage;

a first arithmetic circuit that accepts the voltage output from the logarithmic compression circuit, and outputs a voltage corresponding to a position of the target object in one direction of the two-dimensional direction; and a second arithmetic circuit that accepts the voltage output from the logarithmic compression circuit, and outputs a voltage corresponding to a position of the target object in another direction of the two-dimensional direction, the segmented photodiode is configured such that the light receiving surface is segmented into four light receiving regions by an approximately cross-shaped parting line, on an assumption that a voltage obtained by converting the output current corresponding to a particular light receiving region, among the four light receiving regions, through logarithmic compression performed by the logarithmic compression circuit is Log A, a voltage obtained by converting the output current corresponding to one of the light receiving regions adjacent to the particular light receiving region through logarithmic compression performed by the logarithmic compression circuit is Log B, a voltage obtained by converting the output current corresponding to another one of the light receiving regions adjacent to the particular light receiving region through logarithmic compression performed by the logarithmic compression circuit is Log C, and a voltage obtained by converting the output current corresponding to remaining one of the light receiving regions through logarithmic compression performed by the logarithmic compression circuit is Log D,
the first arithmetic circuit includes:
first and second transistors in which both emitters are connected to each other and both collectors are connected to each other, and the Log B and the Log D are input to bases;
third and fourth transistors in which both emitters are connected to each other and both collectors are connected to each other, and the Log A and the Log C are input to bases;
a first constant current source connected between the emitters of the first to fourth transistors and the ground;
a first resistor connected between the collectors of the first and second transistors and the collectors of the third and fourth transistors; and
a first voltage follower that takes out the voltage corresponding to the position of the target object in the one direction from a connection point between the collectors of the third and fourth transistors and the first resistor, and
the second arithmetic circuit includes:
fifth and sixth transistors in which both emitters are connected to each other and both collectors are connected to each other, and the Log A and the Log B are input to bases;
seventh and eighth transistors in which both emitters are connected to each other and both collectors are connected to each other, and the Log C and the Log D are input to bases;
a second constant current source connected between the emitters of the fifth to eighth transistors and the ground;
a second resistor connected between the collectors of the fifth and sixth transistors and the collectors of the seventh and eighth transistors; and
a second voltage follower that takes out the voltage corresponding to the position of the target object in the other direction from a connection point between the collectors of the seventh and eighth transistors and the second resistor.

6. The optical position detection device according to claim 5, wherein
the arithmetic unit further includes a third arithmetic circuit that outputs a voltage corresponding to a position of the target object in a direction orthogonal to the two-dimensional direction, and
the third arithmetic circuit includes:
thirteenth to sixteenth transistors in which emitters are connected to each other and collectors are connected to each other, and the Log A, the Log B, the Log C, and the Log D are input to bases;
a seventh constant current source connected between the emitters of the thirteenth to sixteenth transistors and the ground;
a seventeenth transistor in which an emitter is grounded via the seventh constant current source, a collector is connected to the collectors of the thirteenth to sixteenth transistors via a third resistor, and a reference voltage is input to a base; and
a third voltage follower that takes out the voltage corresponding to the position of the target object in the direction orthogonal to the two-dimensional direction from a connection point between the collector of the seventeenth transistor and the third resistor.

7. The optical position detection device according to claim 5, wherein
the arithmetic unit further includes a third arithmetic circuit that outputs a voltage corresponding to a position of the target object in a direction orthogonal to the two-dimensional direction, and
the third arithmetic circuit includes:
thirteenth to sixteenth transistors in which emitters are connected to each other and collectors are connected to each other, and the Log A, the Log B, the Log C, and the Log D are input to bases;
a seventh constant current source connected between the emitters of the thirteenth to sixteenth transistors and the ground;
a seventeenth transistor in which an emitter is grounded via an eighth constant current source, a collector is connected to the collectors of the thirteenth to sixteenth transistors, and a reference voltage is input to a base;
an eighteenth transistor in which a base is connected to the emitters of the thirteenth to sixteenth transistors, a collector is grounded via a third resistor, and an emitter is connected to a ninth constant current source;
a nineteenth transistor in which a base is connected to the emitter of the seventeenth transistor, a collector is grounded, and an emitter is connected to the ninth constant current source; and
a third voltage follower that takes out the voltage corresponding to the position of the target object in the direction orthogonal to the two-dimensional direction from a connection point between the collector of the eighteenth transistor and the third resistor.

8. The optical position detection device according to claim 5, wherein
the arithmetic unit further includes a third arithmetic circuit that outputs a voltage corresponding to a position of the target object in a direction orthogonal to the two-dimensional direction, and
the third arithmetic circuit includes:
thirteenth to sixteenth transistors in which emitters are connected to each other and collectors are connected to each other, and the Log A, the Log B, the Log C, and the Log D are input to bases;
a seventh constant current source connected between the emitters of the thirteenth to sixteenth transistors and the ground;
a seventeenth transistor in which an emitter is grounded via an eighth constant current source, a collector is connected to the collectors of the thirteenth to sixteenth transistors, and a reference voltage is input to a base;
an eighteenth transistor in which a base is connected to the emitters of the thirteenth to sixteenth transistors, a collector is connected to the collectors of the thirteenth to sixteenth transistors, and an emitter is connected to a ninth constant current source;
a nineteenth transistor in which abuse is connected to the emitter of the seventeenth transistor, a collector is connected to the collector of the seventeenth transistor via a third resistor, and an emitter is connected to the ninth constant current source; and
a third voltage follower that takes out the voltage corresponding to the position of the target object in the direction orthogonal to the two-dimensional direction from a connection point between the collector of the nineteenth transistor and the third resistor.

9. An optical position detection device comprising:
a light irradiation unit that irradiates a target object with light; and
a light receiving unit that receives reflected light from the target object, wherein
the light receiving unit includes:
- a segmented photodiode in which a light receiving surface is two-dimensionally segmented into a plurality of light receiving regions, the segmented photodiode outputting a current corresponding to intensity of light received by each of the light receiving regions;
- a light receiving lens that condenses the reflected light from the target object and forms an image of the target object on the light receiving surface of the segmented photodiode; and
- an arithmetic unit that detects a position of the target object in a two-dimensional direction orthogonal to an optical axis of the light receiving lens, based on output currents corresponding to the respective light receiving regions of the segmented photodiode, the arithmetic unit includes:
- a logarithmic compression circuit that logarithmically compresses the output current corresponding to each of the light receiving regions of the segmented photodiode, converts into a voltage, and outputs the voltage;
- a first arithmetic circuit that accepts the voltage output from the logarithmic compression circuit, and outputs a voltage corresponding to a position of the target object in one direction of the two-dimensional direction; and
- a second arithmetic circuit that accepts the voltage output from the logarithmic compression circuit, and outputs a voltage corresponding to a position of the target object in another direction of the two-dimensional direction, the segmented photodiode is configured such that the light receiving surface is segmented into four light receiving regions by an approximately cross-shaped parting line,
on an assumption that a voltage obtained by converting the output current corresponding to a particular light receiving region, among the four light receiving regions, through logarithmic compression performed by the logarithmic compression circuit is Log A, a voltage obtained by converting the output current corresponding to one of the light receiving regions adjacent to the particular light receiving region through logarithmic compression performed by the logarithmic compression circuit is Log B, a voltage obtained by converting the output current corresponding to another one of the light receiving regions adjacent to the particular light receiving region through logarithmic compression performed by the logarithmic compression circuit is Log C, and a voltage obtained by converting the output current corresponding to remaining one of the light receiving regions through logarithmic compression performed by the logarithmic compression circuit is Log D, the first arithmetic circuit includes:
- first and second transistors in which both emitters are connected to each other and both collectors are connected to each other, and the Log B and the Log D are input to bases;
- a first constant current source connected between the emitters of the first and second transistors and the ground;
- third and fourth transistors in which both emitters are connected to each other and both collectors are connected to each other, and the Log A and the Log C are input to bases;
- a second constant current source connected between the emitters of the third and fourth transistors and the ground;
- a fifth transistor in which a base is connected to the emitters of the first and second transistors, a collector is grounded via a first resistor, and an emitter is connected to a third constant current source;
- a sixth transistor in which a base is connected to the emitters of the third and fourth transistors, a collector is grounded, and an emitter is connected to the third constant current source; and
- a first voltage follower that takes out the voltage corresponding to the position of the target object in the one direction from a connection point between the collector of the fifth transistor and the first resistor, and the second arithmetic circuit includes:
- seventh and eighth transistors in which both emitters are connected to each other and both collectors are connected to each other, and the Log A and the Log B are input to bases;
- a fourth constant current source connected between the emitters of the seventh and eighth transistors and the ground;
- ninth and tenth transistors in which both emitters are connected to each other and both collectors are connected to each other, and the Log C and the Log D are input to bases;
- a fifth constant current source connected between the emitters of the ninth and tenth transistors and the ground;
- an eleventh transistor in which a base is connected to the emitters of the seventh and eighth transistors, a collector is grounded via the second resistor, and an emitter is connected to a sixth constant current source;
- a twelfth transistor in which a base is connected to the emitters of the ninth and tenth transistors, a collector is grounded, and an emitter is connected to the sixth constant current source; and
- a second voltage follower that takes out the voltage corresponding to the position of the target object in the other direction from a connection point between the collector of the eleventh transistor and the second resistor.

10. An optical position detection device comprising:
a light irradiation unit that irradiates a target object with light; and
a light receiving unit that receives reflected light from the target object, wherein
the light receiving unit includes:
- a segmented photodiode in which a light receiving surface is two-dimensionally segmented into a plurality of light receiving regions, the segmented photodiode outputting a current corresponding to intensity of light received by each of the light receiving regions;
- a light receiving lens that condenses the reflected light from the target object and forms an image of the target object on the light receiving surface of the segmented photodiode; and
- an arithmetic unit that detects a position of the target object in a two-dimensional direction orthogonal to an optical axis of the light receiving lens, based on output currents corresponding to the respective light receiving regions of the segmented photodiode, the arithmetic unit includes:
- a logarithmic compression circuit that logarithmically compresses the output current corresponding to each of the light receiving regions of the segmented photodiode, converts into a voltage, and outputs the voltage;
- a first arithmetic circuit that accepts the voltage output from the logarithmic compression circuit, and outputs a voltage corresponding to a position of the target object in one direction of the two-dimensional direction; and
- a second arithmetic circuit that accepts the voltage output from the logarithmic compression circuit, and outputs a voltage corresponding to a position of the target object in another direction of the two-dimensional direction, the segmented photodiode is configured such that the light receiving surface is segmented into four light receiving regions by an approximately cross-shaped parting line, on an assumption that a voltage obtained by converting the output current corresponding to a particular light receiving region, among the four light receiving regions, through logarithmic compression performed by the logarithmic compression circuit is Log A, a voltage obtained by converting the output current corresponding to one of the light receiving regions adjacent to the particular light receiving region through logarithmic compression performed by the logarithmic compression circuit is Log B, a voltage obtained by converting the output current corresponding to another one of the light receiving regions adjacent to the particular light receiving region through logarithmic compression performed by the logarithmic compression circuit is Log C, and a voltage obtained by converting the output current corresponding to remaining one of the light receiving regions through logarithmic compression performed by the logarithmic compression circuit is Log D, the first arithmetic circuit includes:
- first and second transistors in which both emitters are connected to each other and both collectors are connected to each other, and the Log B and the Log D are input to bases;
- a first constant current source connected between the emitters of the first and second transistors and the ground;
- third and fourth transistors in which both emitters are connected to each other and both collectors are connected to each other, and the Log A and the Log C are input to bases;
- a second constant current source connected between the emitters of the third and fourth transistors and the ground;
- a fifth transistor in which a base is connected to the emitters of the first and second transistors, a collector is connected to the collectors of the first and second transistors, and an emitter is connected to a third constant current source;
- a sixth transistor in which a base is connected to the emitters of the third and fourth transistors, a collector is connected to the collectors of the third and fourth transistors via a first resistor, and an emitter is connected to the third constant current source; and
- a first voltage follower that takes out the voltage corresponding to the position of the target object in the one direction from a connection point between the collector of the sixth transistor and the first resistor, and the second arithmetic circuit includes:
- seventh and eighth transistors in which both emitters are connected to each other and both collectors are connected to each other, and the Log A and the Log B are input to bases;
- a fourth constant current source connected between the emitters of the seventh and eighth transistors and the ground;
- ninth and tenth transistors in which both emitters are connected to each other and both collectors are connected to each other, and the Log C and the Log D are input to bases;
- a fifth constant current source connected between the emitters of the ninth and tenth transistors and the ground;
- an eleventh transistor in which a base is connected to the emitters of the seventh and eighth transistors, a collector is connected to the collectors of the seventh and eighth transistors, and an emitter is connected to a sixth constant current source;
- a twelfth transistor in which a base is connected to the emitters of the ninth and tenth transistors, a collector is connected to the collectors of the ninth and tenth transistors via a second resistor, and an emitter is connected to the sixth constant current source; and
- a second voltage follower that takes out the voltage corresponding to the position of the target object in the other direction from a connection point between the collector of the twelfth transistor and the second resistor.

11. An optical position detection device comprising:
a light irradiation unit that irradiates a target object with light; and
a light receiving unit that receives reflected light from the target object, wherein
the light receiving unit includes:
- a segmented photodiode in which a light receiving surface is two-dimensionally segmented into a plurality of light receiving regions, the segmented photodiode outputting a current corresponding to intensity of light received by each of the light receiving regions;
- a light receiving lens that condenses the reflected light from the target object and forms an image of the target object on the light receiving surface of the segmented photodiode; and
- an arithmetic unit that detects a position of the target object in a two-dimensional direction orthogonal to an optical axis of the light receiving lens, based on output currents corresponding to the respective light receiving regions of the segmented photodiode, the light irradiation unit includes:
- a light emitting device; and
- a diffusion filter that converts infrared light emitted from the light emitting device into diffused light, and irradiates the target object with the diffused light.

12. An optical position detection method comprising:
irradiating a target object with light;
condensing reflected light from the target object by a light receiving lens, and forming an image of the target object on a light receiving surface of a segmented photodiode, the light receiving surface being two-dimensionally segmented into a plurality of light receiving regions;
taking out an output current corresponding to intensity of light received by each of the light receiving regions, from the segmented photodiode;

detecting a position of the target object in a two-dimensional direction orthogonal to an optical axis of the light receiving lens, based on the respective output currents taken out; and detecting a position of the target object in a direction orthogonal to the two-dimensional direction, based on a ratio of a predetermined reference value, to a sum of a total sum of the output currents corresponding to the respective light receiving regions of the segmented photodiode and the reference value.

13. The optical position detection method according to claim 12, wherein the segmented photodiode is configured such that the light receiving surface is segmented into four light receiving regions by an approximately cross-shaped parting line, and the detecting the position of the target object based on the output currents includes detecting a position of the target object in one direction of the two-dimensional direction, based on a ratio of a sum of the output currents corresponding to two adjacent light receiving regions among the four light receiving regions, to a total sum of the output currents corresponding to the respective light receiving regions of the segmented photodiode, and detecting a position of the target object in another direction of the two-dimensional direction, based on a ratio of a sum of the output currents corresponding to two light receiving regions which are adjacent in a direction orthogonal to an alignment direction of the two light receiving regions used for detection of the position of the target object in the one direction among the four light receiving regions, to a total sum of the output currents corresponding to the respective light receiving regions of the segmented photodiode.

\* \* \* \* \*